(12) United States Patent
Jin (10) Patent No.: US 12,272,589 B2
(45) Date of Patent: Apr. 8, 2025

(54) EJECTOR PIN DEVICE FOR CHIP PACKAGING

(71) Applicant: CHIPMORE TECHNOLOGY CORPORATION LIMITED, Suzhou (CN)

(72) Inventor: Chaochao Jin, Suzhou (CN)

(73) Assignee: CHIPMORE TECHNOLOGY CORPORATION LIMITED, Suzhou (CN)

( * ) Notice: Subject to any disclaimer, the term of this patent is extended or adjusted under 35 U.S.C. 154(b) by 629 days.

(21) Appl. No.: 17/620,062

(22) PCT Filed: Oct. 13, 2020

(86) PCT No.: PCT/CN2020/120539
§ 371 (c)(1),
(2) Date: Dec. 16, 2021

(87) PCT Pub. No.: WO2021/129053
PCT Pub. Date: Jul. 1, 2021

(65) Prior Publication Data
US 2022/0352003 A1  Nov. 3, 2022

(30) Foreign Application Priority Data
Dec. 24, 2019  (CN) .......................... 201911346279.8

(51) Int. Cl.
*H01L 21/687*  (2006.01)
*H01L 21/683*  (2006.01)
(Continued)

(52) U.S. Cl.
CPC .... *H01L 21/68742* (2013.01); *H01L 21/6838* (2013.01); *H01L 21/68785* (2013.01);
(Continued)

(58) Field of Classification Search
CPC ........... H01L 21/68742; H01L 21/6838; H01L 21/68785; H01L 21/48; H01L 21/67132;
(Continued)

(56) References Cited

U.S. PATENT DOCUMENTS

| | | | |
|---|---|---|---|
| 6,204,092 B1 * | 3/2001 | Freund .............. | H01L 21/67132 438/464 |
| 10,410,905 B1 * | 9/2019 | Peterson ........... | H01L 21/67132 |
| 2009/0193916 A1 * | 8/2009 | Watanabe ........... | F16H 25/2021 74/216.3 |
| 2011/0088845 A1 * | 4/2011 | Chong .............. | H01L 21/67132 156/761 |

(Continued)

FOREIGN PATENT DOCUMENTS

| | | |
|---|---|---|
| CN | 103681441 A | 3/2014 |
| CN | 105140156 A | 12/2015 |

(Continued)

OTHER PUBLICATIONS

Chip Plunge-Up Device; Document ID: JP H05326672 A; Date Published: Dec. 10, 1993; Inventor: Toi Yutaka, Sakai Takashi, Matsunaga Yoshiaki; Date Filed: May 21, 1992 (Year: 1993).*

*Primary Examiner* — Mahdi H Nejad
(74) *Attorney, Agent, or Firm* — Cheng-Ju Chiang (57) ABSTRACT

The present invention discloses an ejector pin device for chip packaging, which comprises a pin cylinder, a base and an ejector pin base module, wherein the pin cylinder sleeves the ejector pin base module, the base is located below the ejector pin base module and is configured to fix the ejector pin base module; and the ejector pin base module comprises a knob unit and a supporting unit. An effect of adjusting the knob unit can be acted on the corresponding supporting unit, so that the requirements of the numbers and positions of the ejector pins required by different products are satisfied and metal foreign matters are reduced, thereby improving the efficiency of replacing products by a worker.

8 Claims, 11 Drawing Sheets

(51) Int. Cl.
 *H05K 7/10* (2006.01)
 *G06F 113/18* (2020.01)
 *H01L 21/48* (2006.01)
 *H05K 13/00* (2006.01)

(52) U.S. Cl.
 CPC ........ *H05K 7/1084* (2013.01); *G06F 2113/18* (2020.01); *H01L 21/48* (2013.01); *H05K 13/0061* (2013.01)

(58) Field of Classification Search
 CPC ......... H01L 21/6836; H01L 2221/6839; Y10T 74/173; H05K 7/1084; H05K 13/0061; G06F 2113/18
 USPC .................................. 269/53; 438/464, 106
 See application file for complete search history.

(56) References Cited

U.S. PATENT DOCUMENTS

2022/0415702 A1\* 12/2022 Drewery ........... H01J 37/32623

FOREIGN PATENT DOCUMENTS

| CN | 107093575 A | | 8/2017 |
|----|----|----|----|
| CN | 206864447 U | | 1/2018 |
| CN | 109935545 A | | 6/2019 |
| CN | 111128846 A | | 5/2020 |
| CN | 114933167 A | \* | 8/2022 |
| IN | 103077918 A | | 5/2013 |
| JP | H5-326672 A | | 12/1993 |
| JP | 2021016004 A | \* | 2/2021 |

\* cited by examiner

EJECTOR PIN DEVICE FOR CHIP PACKAGING

TECHNICAL FIELD

The present invention relates to the field of chip package technologies and in particular to an ejector pin device for chip packaging.

BACKGROUND

At the present stage, the pick-up and placement of chips are completed mainly by a suction nozzle, a blue film tray, and an ejector pin mechanism jointly. The chips are distributed on the movable blue film tray, and after the current chip is picked up, the blue film tray moves so that the next chip is located above an ejector pin for being picked up. The ejector pin mechanism is located below the blue film tray, and may push up the chip from a cut wafer, and thus the chip is picked up by the suction nozzle located above the blue film tray.

In a chip bonding machine, as chips of various products have different lengths and sizes, the required number of ejector pins and positions of mounting holes of the ejector pins are also different. If the product needs to be replaced, it is often necessary to dismount a pin cylinder for replacing the ejector pins, adjust the new ejector pin to the level, and then mount the pin cylinder. In addition, the stability of the ejector pin mechanism determines whether the chip can be picked up smoothly from the blue film tray, and further determines whether equipment can perform production stably and reliably.

However, during replacement of the product, manual operations are usually required. When a worker dismounts and mounts the pin cylinder for adjusting the ejector pin, mounting deviations or metal foreign objects appear easily, which causes abnormality of the product. Moreover, in order to adapt to different chips, it is required to frequently replace the product, which greatly reduces the working efficiency of the ejector pin mechanism.

Therefore, it is of great significance to design an ejector pin device that can greatly improve the chip package efficiency.

SUMMARY

For the technical problems in the prior art, the purpose of the present invention is to provide an ejector pin device for chip packaging, in which the effect of adjusting only a knob unit can be acted on a corresponding supporting unit, so that the requirements of the numbers and positions of ejector pins required by different products are satisfied and metal foreign matters are reduced, thereby improving the chip package efficiency.

The purpose of the present invention is achieved through the following technical solutions. The ejector pin device for chip packaging comprises a pin cylinder, a base and an ejector pin base module, wherein the pin cylinder sleeves the ejector pin base module, and the base is located below the ejector pin base module and is configured to fix the ejector pin base module;

the ejector pin base module comprises a knob unit and a supporting unit, wherein a dismountable ejector pin is disposed at the top of the supporting unit, the knob unit sleeves the supporting unit, and when the knob unit is turned, the supporting unit moves vertically; and a vacuum hole and an ejector pin hole corresponding to the ejector pin are formed in the upper surface of the pin cylinder.

Preferably, there are at least two supporting units, the number of the knob units is identical to that of the supporting units, and the knob units correspond to the supporting units one by one.

Preferably, there are three supporting units, which are an outer supporting unit, a middle supporting unit and an inner supporting unit respectively;

there are three knob units, which are in one-to-one correspondence with the supporting units and are an outer knob, a middle knob and an inner knob respectively; and the outer supporting unit, the middle supporting unit and the inner supporting unit are nested with one another, a sliding groove is formed in the surface of each of the three supporting units, and the adjacent supporting units move vertically through the sliding grooves under the control of the knob units.

Preferably, a first platform is disposed above the outer supporting unit, and a first ejector pin and a second ejector pin are disposed at two ends of the first platform respectively;

a second platform is disposed above the middle supporting unit, and a third ejector pin and a fourth ejector pin are disposed at two ends of the second platform respectively; and a third platform is disposed above the inner supporting unit, and a fifth ejector pin and a sixth ejector pin are disposed at two ends of the third platform respectively.

Preferably, six ejector pin holes are formed in the upper surface of the pin cylinder, and correspond to the first ejector pin, the second ejector pin, the third ejector pin, the fourth ejector pin, the fifth ejector pin and the sixth ejector pin respectively.

Preferably, the outer knob controls the first platform to move vertically; the middle knob controls the second platform to move vertically; and the inner knob controls the third platform to move vertically; and when the first platform, the second platform and the third platform move to the same horizontal plane, the first ejector pin, the second ejector pin, the third ejector pin, the fourth ejector pin, the fifth ejector pin and the sixth ejector pin are arranged in sequence.

Preferably, a first supporting post is disposed between the outer supporting unit and the first platform, a second supporting post is disposed between the middle supporting unit and the second platform, and a third supporting post is disposed between the inner supporting unit and the third platform; and a bent portion is disposed at the lower end of the second supporting post.

Preferably, a basic shaft is vertically disposed at the center of the base and corresponds to the sliding groove in the inner surface of the inner supporting unit; and a circular hole is formed in the surface of the base.

Preferably, a groove corresponding to the bent portion of the second supporting post is formed in the top of the inner supporting unit.

Preferably, a guide groove for driving the supporting unit to move vertically is disposed in the knob unit; and a protrusion matching the guide groove is disposed on the outer side of the supporting unit.

Compared with the prior art, the present invention has the following advantages and effects.

1. For the ejector pin device for chip packaging according to the present invention, the effect of adjusting the knob unit can be acted on the corresponding supporting unit, so that the requirements of the numbers and positions of the ejector pins required by different products are satisfied and metal foreign matters are reduced, thereby improving the efficiency of replacing products by a worker.

2. In the present invention, the sliding grooves are formed in the surfaces of the three supporting units, and the adjacent supporting units move vertically through the sliding grooves under the control of the knob units; and the basic shaft is vertically disposed at the center of the base and corresponds to the sliding groove in the inner surface of the inner supporting unit. Thus, the problem of inclined ascending due to the sliding groove in the single side can be avoided.

DETAILED DESCRIPTION

In order to make a person skilled in the art better understand the technical solutions of the present invention, the technical solutions in the embodiments of the present invention will be clearly and completely described below with reference to the accompanying drawings for the embodiments of the present invention. Obviously, the embodiments described are merely some but not all embodiments of the present invention. Based on the embodiments of the present invention, all other embodiments derived by a person of ordinary skill in the art without creative efforts shall fall within the protection scope of the present invention.

As shown in FIGS. 1-6, an ejector pin device for chip packaging according to a preferred embodiment of the present invention comprises a pin cylinder 1, a base 2 and an ejector pin base module 3. The pin cylinder 1 sleeves the ejector pin base module 3, and the base 2 is located below the ejector pin base module 3 and is configured to fix the ejector pin base module 3. The ejector pin base module 3 comprises a knob unit 31 and a supporting unit 32. A dismountable ejector pin 4 is disposed at the top of the supporting unit 32 and the knob unit 31 sleeves the supporting unit 32. When the knob unit 31 is turned, the supporting unit 32 moves vertically. In addition, an ejector pin hole 6 corresponding to the ejector pin 4 is formed in the upper surface of the pin cylinder 1. For the ejector pin device for chip packaging according to the present invention, the supporting unit 32 is moved upwards by turning the knob unit 31, so that the ejector pin 4 at the top of the supporting unit 32 is pushed up. Therefore, it is convenient for a worker to adjust the level and height of the ejector pin 4, thereby improving the efficiency of replacing products by the worker.

In the ejector pin device for chip packaging according to the present invention, there are at least two supporting units 31, the number of the knob units 32 is identical to that of the supporting units 31, and the knob units 31 correspond to the supporting units 32 one by one.

As shown in FIGS. 7-12, there are preferably three supporting units 32, which are an outer supporting unit 321, a middle supporting unit 322, and an inner supporting unit 323 respectively. Correspondingly, there are three knob units 31, which are in one-to-one correspondence with the supporting units 32 and are an outer knob 311, a middle knob 312 and an inner knob 313 respectively. Of course, according to actual needs, the number of the supporting units 32 and the number of the knob units 31 may be increased or decreased accordingly.

The outer supporting unit 321, the middle supporting unit 322 and the inner supporting unit 323 are nested with one another, that is, the outer supporting unit 321 is located outside the middle supporting unit 322, and the middle supporting unit 322 is located outside the inner supporting unit 323. The outer supporting unit 321, the middle supporting unit 322 and the inner supporting unit 323 form a concentric cylinder. Referring to FIGS. 9-12, a sliding groove 7 is formed in the surface of each of the three supporting units. That is, the sliding groove 7 is formed in each of the inner side of the outer supporting unit 321, the inner side and the outer side of the middle supporting unit 322 and the inner side and the outer side of the inner supporting unit 323; and the sliding grooves 7 are in one-to-one correspondence with one another. The adjacent ejector pins move vertically through the sliding grooves 7 under the control of the knob units 31. By adopting the mode that symmetrical sliding grooves 7 are formed in the surfaces of the supporting units, it is convenient to position the supporting units vertically in a sliding manner, thereby avoiding the problem of inclined ascending due to the sliding groove 7 in the single side.

In this embodiment, the outer knob 311 is located above the middle knob 312; the middle knob 312 is located above the inner knob 313; and the outer knob 311, the middle knob 312 and the inner knob 313 all sleeve the outer supporting unit 321. The outer supporting unit 321 moves vertically by turning the outer knob 311; the middle supporting unit 322 moves vertically by turning the middle knob 312; and the inner supporting unit 323 moves vertically by turning the inner knob 313.

Figure 13:
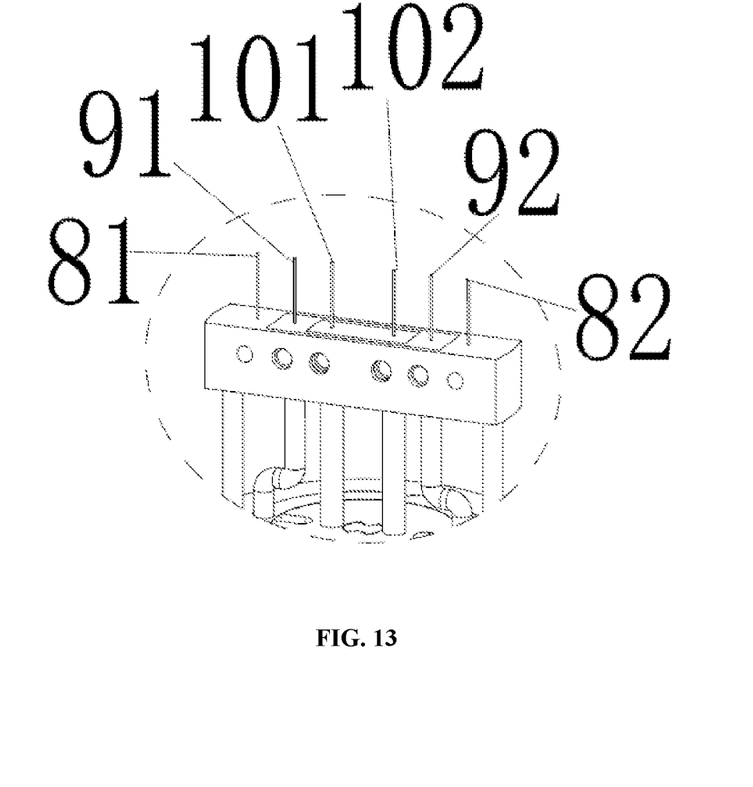
FIG. 13 is a structural schematic diagram when six ejector pins are in the same horizontal plane according to an embodiment of the present invention.

Specifically, a first platform 8 is disposed above the outer supporting unit 321, and a first ejector pin 81 and a second ejector pin 82 are disposed at two ends of the first platform 8 respectively. A second platform 9 is disposed above the middle supporting unit 322, and a third ejector pin 91 and a fourth ejector pin 92 are disposed at two ends of the second platform 9 respectively. A third platform 10 is disposed above the inner supporting unit 323, and a fifth ejector pin 101 and a sixth ejector pin 102 are disposed at two ends of the third platform 10 respectively. The outer knob 311 controls the first platform 8 to move vertically; the middle knob 312 controls the second platform 9 to move vertically; and the inner knob 313 controls the third platform 10 to move vertically. When the first platform 8, the second platform 9 and the third platform 10 are moved to the same horizontal plane, the first ejector pin 81, the second ejector pin 82, the third ejector pin 91, the fourth ejector pin 92, the fifth ejector pin 101 and the sixth ejector pin 102 are arranged in sequence. That is, when the first platform 8, the second platform 9 and the third platform 10 are moved to the same horizontal plane, the first ejector pin 81 and the second ejector pin 82 are located at two outermost ends respectively; the fifth ejector pin 101 and the sixth ejector pin 102 are located at two innermost ends respectively; the third ejector pin 91 is located between the first ejector pin 81 and the fifth ejector pin 101, and the fourth ejector pin 92 is located between the second ejector pin 82 and the sixth ejector pin 102, referring to FIG. 13. The corresponding ejector pins 4 are pushed up to appropriate height via the knob, which improves the efficiency of replacing the hardware of a machine when the worker works on different products.

Figure 1:
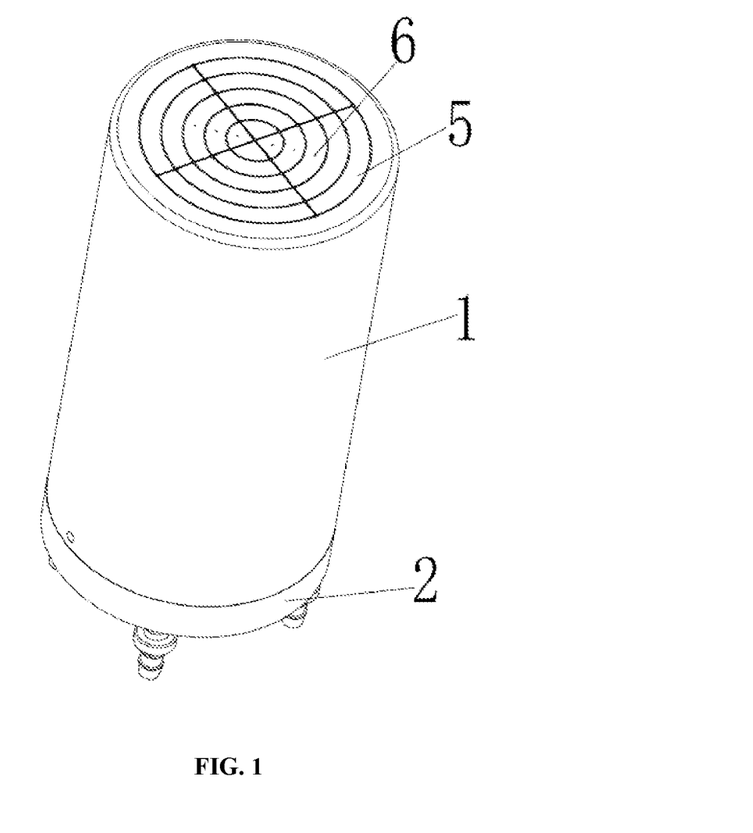
FIG. 1 is a front view of an ejector pin device for chip packaging according to an embodiment of the present invention.
Figure 2:
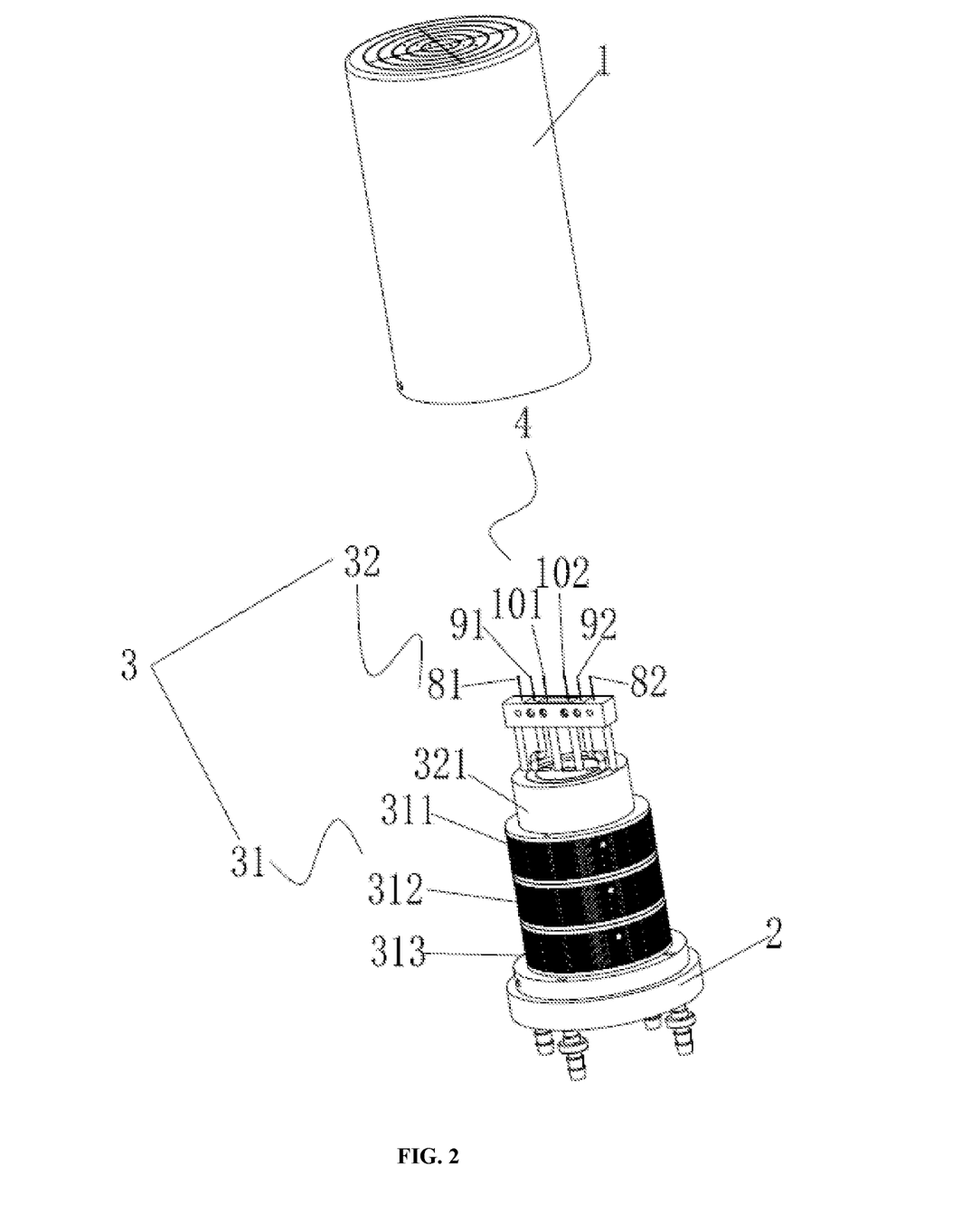
FIG. 2 is a structural schematic diagram of the ejector pin device for chip packaging according to the embodiment of the present invention.
Figure 3:
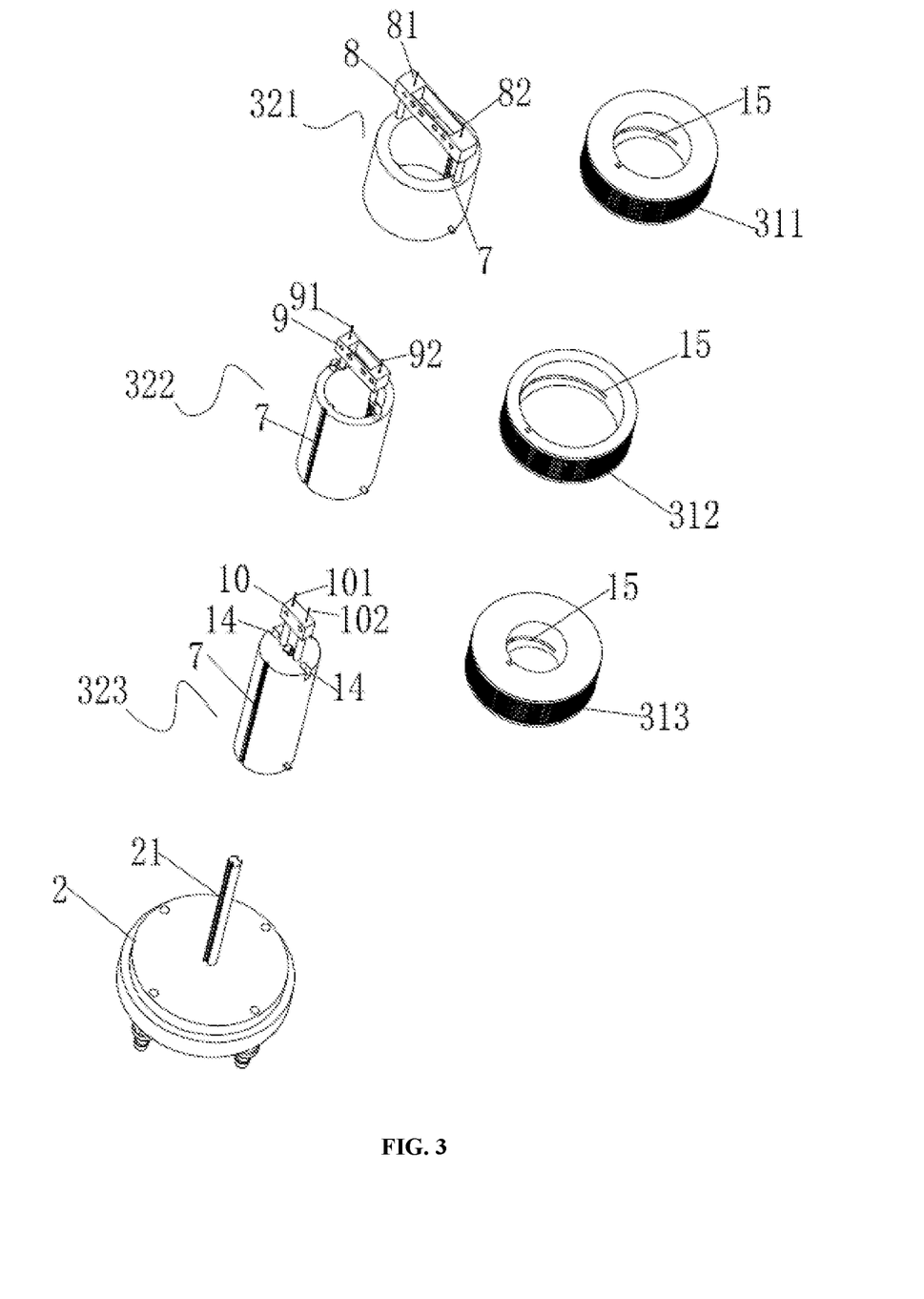
FIG. 3 is an exploded view of a base and an ejector pin base module according to an embodiment of the present invention.
Figure 4:
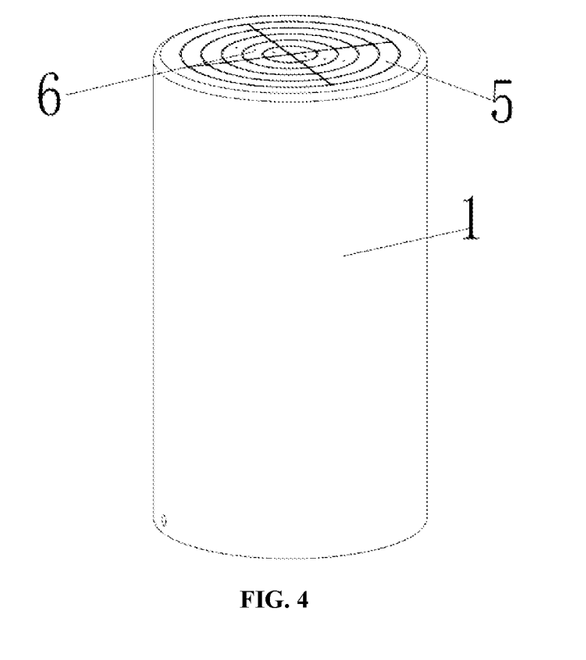
FIG. 4 is a front view of a pin cylinder according to an embodiment of the present invention.
Figure 5:
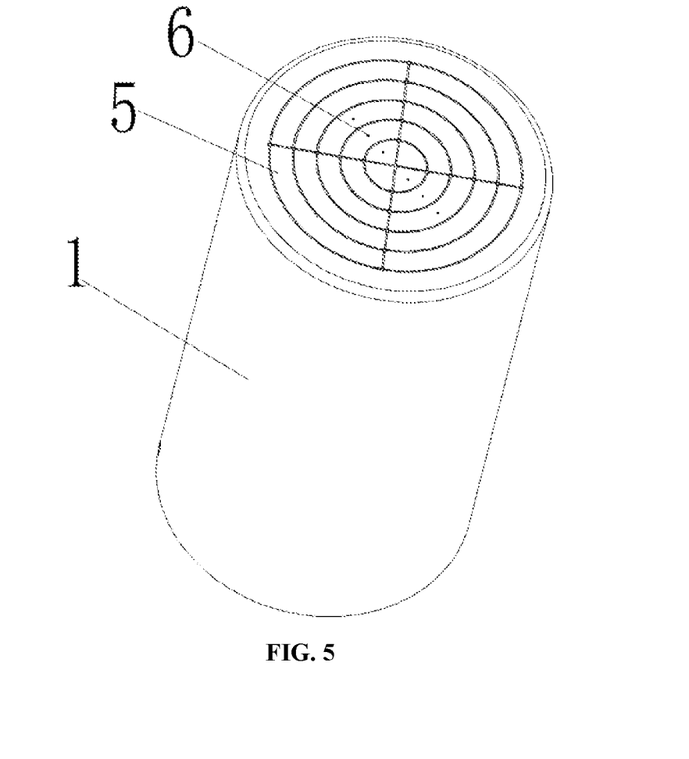
FIG. 5 is a side view of the pin cylinder according to the embodiment of the present invention.
Figure 6:
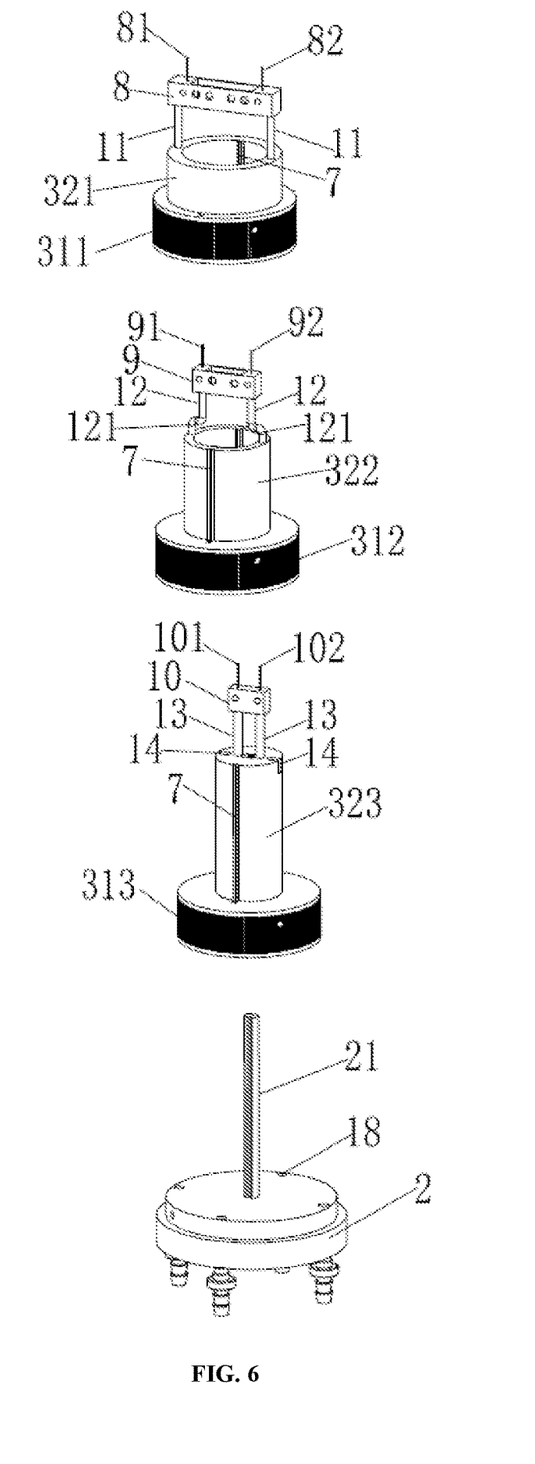
FIG. 6 is a structural schematic diagram of the base and the ejector pin base module according to the embodiment of the present invention.
Figure 7:
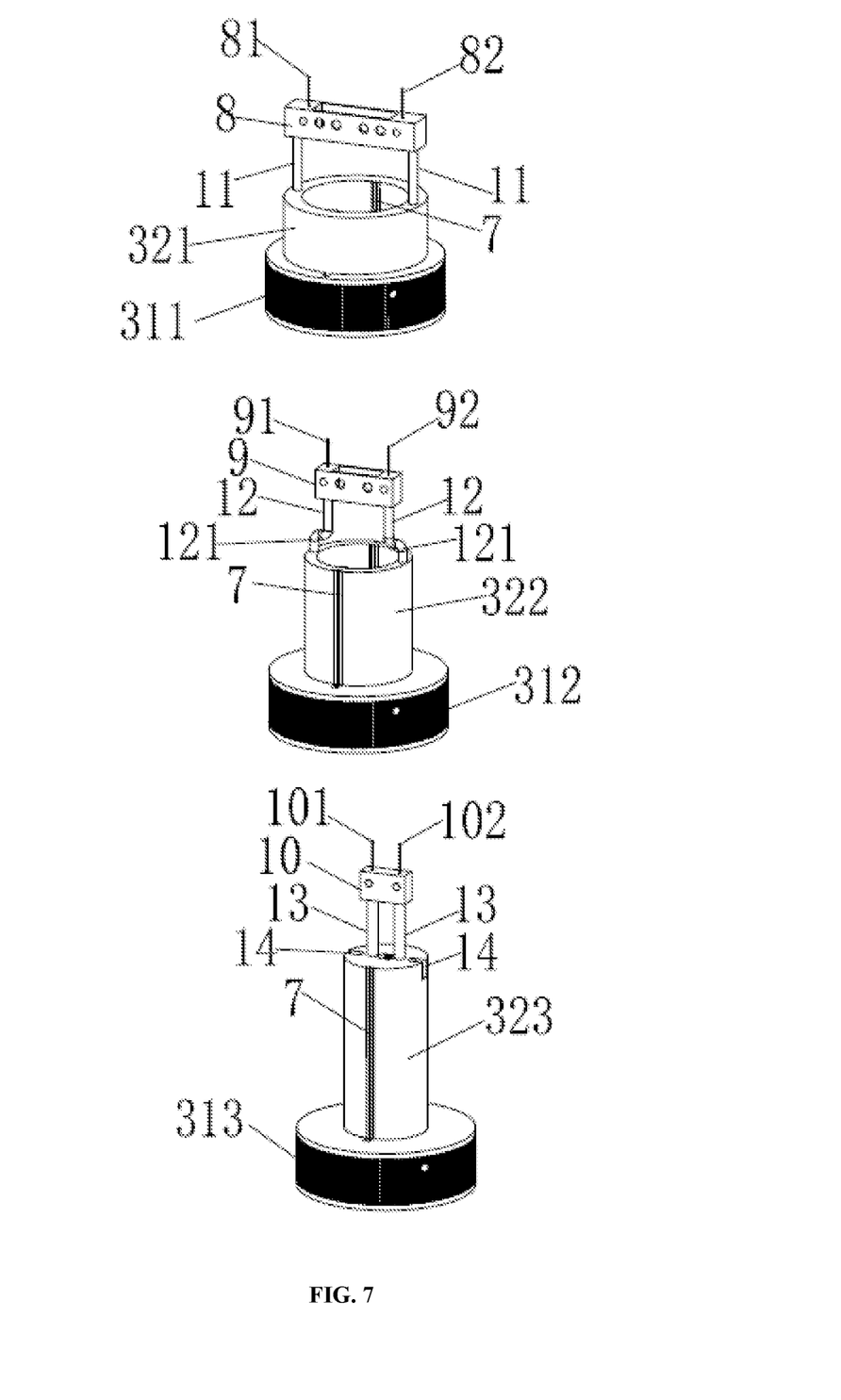
FIG. 7 is a structural schematic diagram of the ejector pin base module according to the embodiment of the present invention.

In addition, six ejector pin holes 6 are formed in the upper surface of the pin cylinder 1, and correspond to the first ejector pin 81, the second ejector pin 82, the third ejector pin 91, the fourth ejector pin 92, the fifth ejector pin 101 and the sixth ejector pin 102 respectively.

In comparison with an existing package machine in which during replacement of a product, the worker often needs to manually dismount and mount the ejector pins 4, but cannot ensure that the positions of the ejector pins 4 are on the horizontal line after dismounting and mounting each time, resulting in an increase in the number of workers, the ejector pin device for chip packaging according to the present invention has the advantages that when the first platform 8, the second platform 9 and the third platform 10 are moved to the same horizontal plane, the first ejector pin 81, the second ejector pin 82, the third ejector pin 91, the fourth ejector pin 92, the fifth ejector pin 101 and the sixth ejector pin 102 are all on the horizontal plane. Each ejector pin 4 is fixed through a set screw, the set screw is also called a jack screw for fixing, most of which is a shaft hole, and the jack screw abuts against a shaft, such that the shaft cannot move back and forth. The set screw fixes the ejector pin 4 to the corresponding platform and the mounting of the set screw does not interfere with the supporting unit nested outside. Therefore, the situation that the knob unit 31 interferes with the set screw when pushing up the supporting unit is avoided. The ejector pin 4 at the required position can be pushed up by only adjusting the corresponding knob unit 31 by the worker, thereby improving the chip package efficiency. In addition, the metal foreign matters produced when the worker dismounts and mounts the pin cylinder 1 for adjusting the ejector pins 4 are reduced, thereby avoiding a short circuit after the chip package.

In addition, a first supporting post 11 is disposed between the outer supporting unit 321 and the first platform 8, a second supporting post 12 is disposed between the middle supporting unit 322 and the second platform 9, and a third supporting post 13 is disposed between the inner supporting unit 323 and the third platform 10. The first supporting post 11 and the third supporting post 13 are cylindrical. In addition, in order to prevent the second platform 9 from interfering with and obstructing the bottom surface of the outer supporting unit 321 when the second platform 9 is pushed up under the action of the middle knob 312, a bent portion 121 is disposed at the lower end of the second supporting post 12. Correspondingly, in order to cooperate with the bent portion 121 at the lower end of the second supporting post 12, a groove 14 corresponding to the bent portion 121 of the second supporting post 12 is formed in the top of the inner supporting unit 323. With this design, it is possible to prevent the third platform 10 from interfering with and obstructing the second supporting post 12 when the third platform 10 is pushed up under the action of the inner knob 313.

Figure 14:
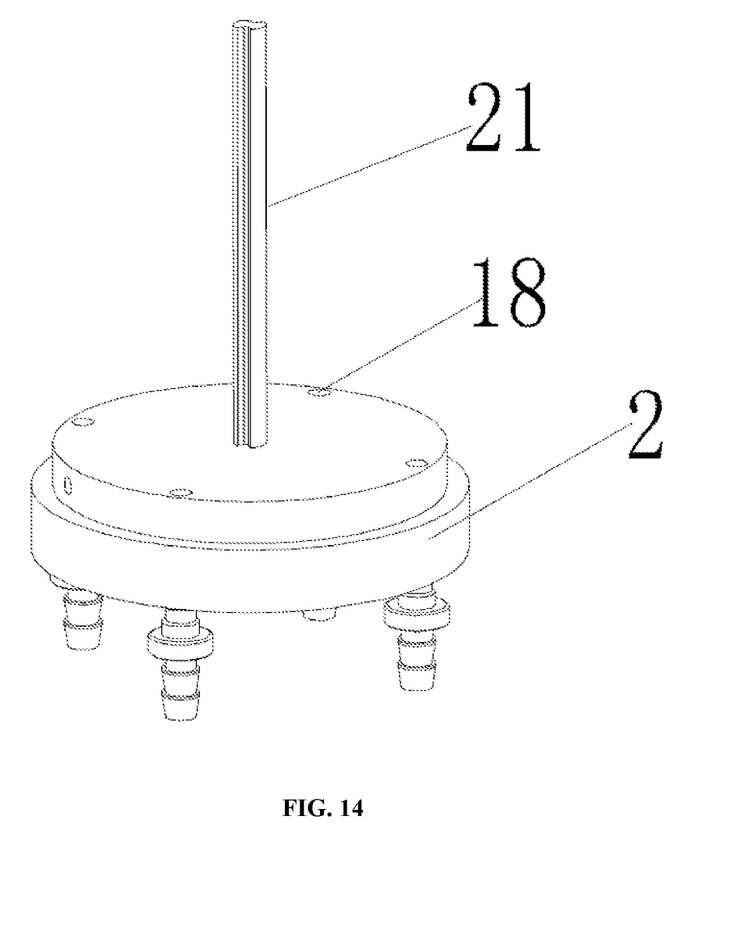
FIG. 14 is a front view of a base according to an embodiment of the present invention.

As shown in FIG. 14, a basic shaft 21 is vertically disposed at the center of the base 2 and corresponds to the sliding groove 7 in the inner side of the inner supporting unit 323. A circular hole 18 is formed in the surface of the base 2 and is used in vacuumization of the pin cylinder 1. The number of the circular holes 18 is plural, preferably four, and the circular holes 18 are distributed in a circumferential array, which may make the vacuum adsorption more balanced. In addition to the six ejector pin holes 6, a vacuum hole 5 and a vacuum groove are further formed in the upper surface of the pin cylinder 1. Through the interaction of the base 2 and the pin cylinder 1, the vacuum leakage of the pin cylinder can be reduced, thereby improving the vacuum adsorption stability. When the worker frequently replaces products, abnormal operations, such as abnormal chip suction and vacuum leakage, often occur in the mounting of the ejector pins 4 or the pin cylinder 1. However, if the circular hole 18 is formed in the surface of the base 2 and the vacuum hole 5 and the vacuum groove are formed in the upper surface of the pin cylinder 1, the abnormal chip suction and vacuum leakage can be reduced. In addition, a threaded hole is formed in the bottom of the base 2, and a set screw hole is formed in one side of the bottom of the pin cylinder 1 and the pin cylinder 1 is fixed via the set screw.

Figure 8:
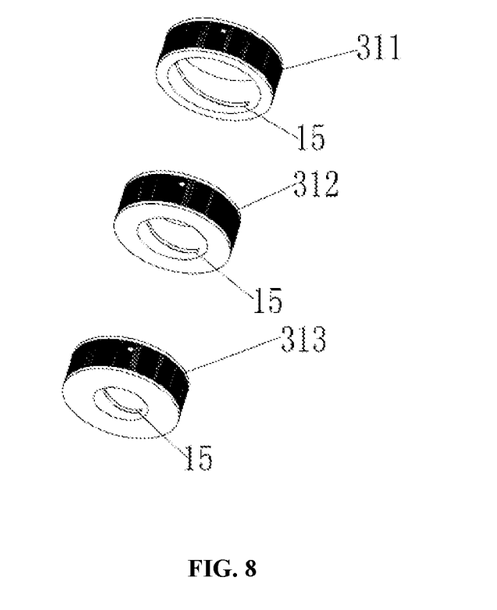
FIG. 8 is a structural schematic diagram of a knob unit according to an embodiment of the present invention.

In this embodiment, embossing 17 is disposed on the outer surface of the knob unit 31, so that the attractive appearance is achieved and the embossing 17 may play an antiskid effect when the worker operates the knob unit 31. In addition, a set screw hole is formed in one side of the knob unit 31 for fixing the supporting unit.

Figure 9:
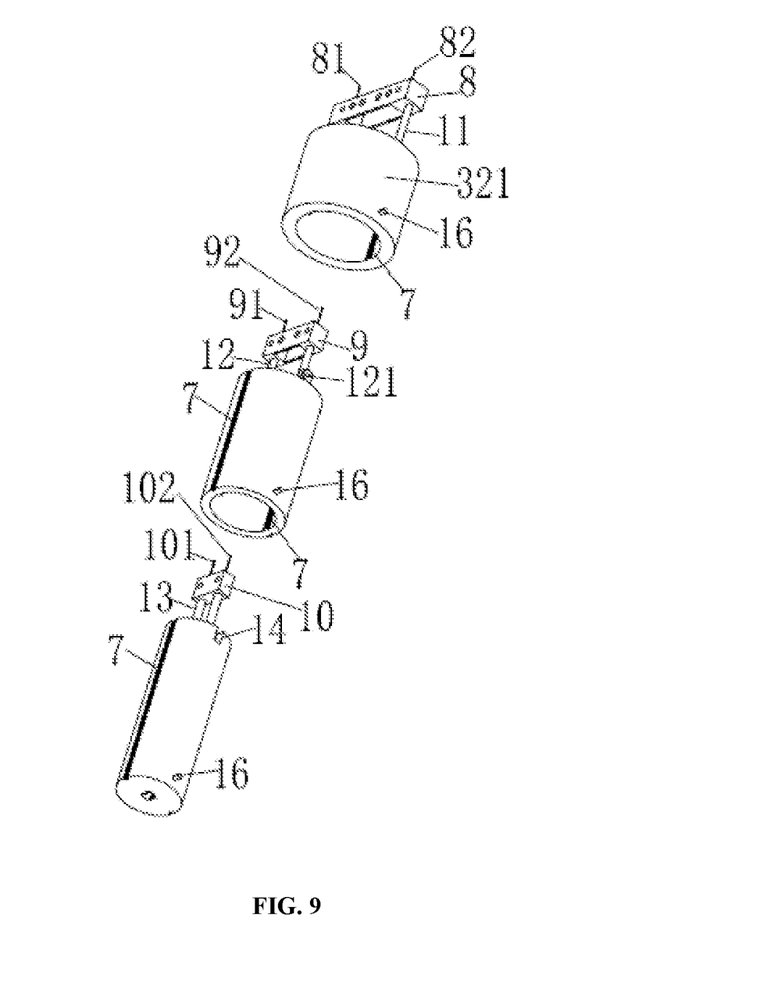
FIG. 9 is a structural schematic diagram of a supporting unit according to an embodiment of the present invention.
Figure 10:
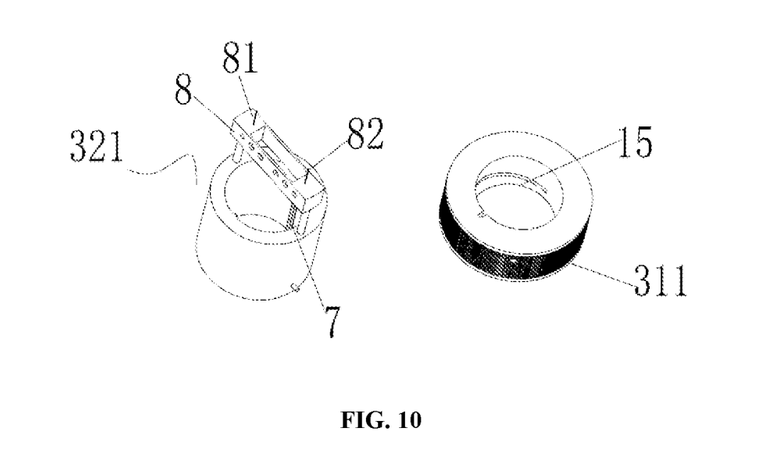
FIG. 10 is a structural schematic diagram of an outer supporting unit and an outer knob according to an embodiment of present invention.
Figure 11:
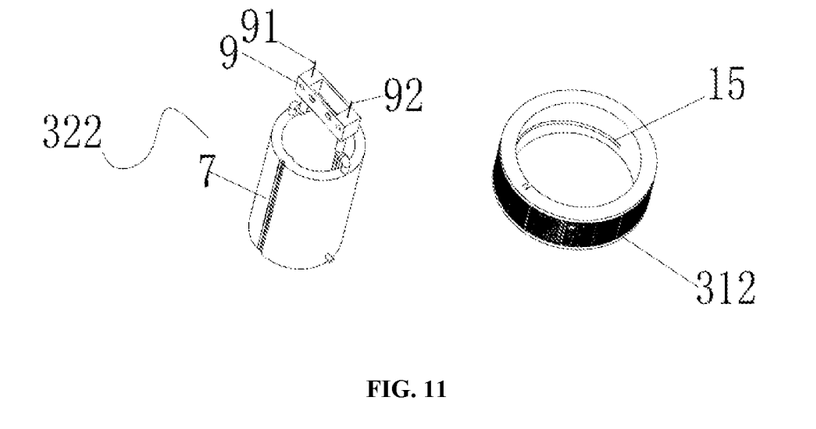
FIG. 11 is a structural schematic diagram of a middle supporting unit and a middle knob according to an embodiment of present invention.
Figure 12:
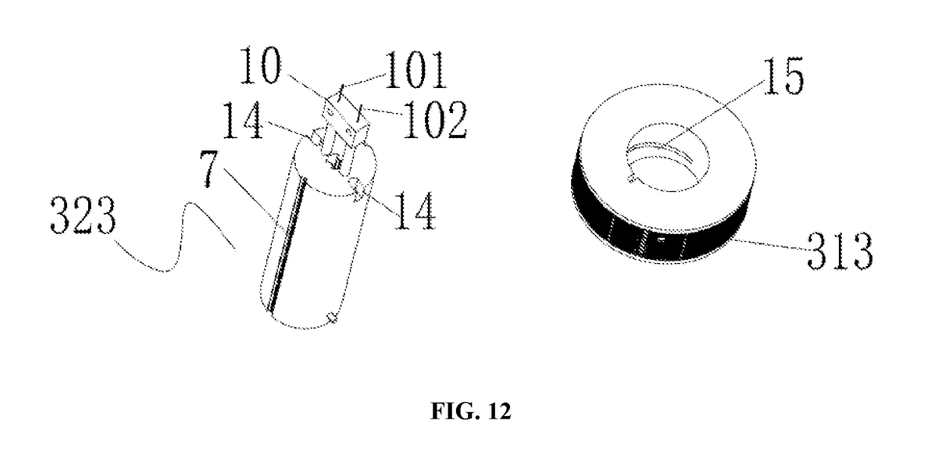
FIG. 12 is a structural schematic diagram of an inner supporting unit and an inner knob according to an embodiment of present invention.

In addition, an accommodating cavity for accommodating the supporting unit is formed in the knob unit 31; and a guide groove 15 for driving the supporting unit 32 to move vertically is formed in the inner wall surface of the accommodating cavity by etching, and is a cam groove. The supporting unit corresponding to the knob unit 31 slides in the guide groove 15 to realize the vertical movement of the supporting unit. A release opening is formed in the outer side of the guide groove 15 for placing the supporting unit. In addition, a protrusion 16 matching the guide groove 15 is disposed on the outer side of each of the outer supporting unit 321, the middle supporting unit 322 and the inner supporting unit 323. For the ejector pin device for chip packaging according to the present invention, the cam groove guide structure is internally designed, the protrusion 16 is disposed for matching the opening, and the expansion length of the cam groove is set to be identical to the ascending and descending height of the supporting unit. Through the mode that the cam grooves are formed in the three knobs, the curve of the cam groove is accurately calculated based on the push-up height of the ejector pin 4, and then the internal surface is etched, thereby achieving the simple structure, beautiful design appearance and convenient operation.

An experiment carried out based on this design verifies that by adopting the above structure, it only needs to replace the ejector pin 4 of 0.1 mm or 0.14 mm once according to product requirements, which is convenient and efficient, has a low risk and is conductive to vigorous promotion in similar devices.

The working principle of the ejector pin device for chip packaging according to the present invention is as follows. Based on the size of the product, the corresponding knob is adjusted, the corresponding supporting unit moves upwards, and the corresponding platform rises. Thus, the ejector pin 4 above the platform is pushed up. In addition, in the present invention, after the first mounting is completed, it only needs to adjust the level and height of the ejector pin 4 once. Thus, the efficiency of replacing hardware and the reliability of pushing up chips by the ejector pins 4 are improved greatly.

It should be understood that although the description is described according to the embodiments, not every embodiment comprises only one independent technical solution. This presentation manner of the description is only for clarity. Those skilled in the art should consider the description as a whole, and technical solutions in all of the embodiments may also be properly combined to form other embodiments that will be understood by those skilled in the art.

The above detailed description only aims to specifically illustrate the feasible embodiments of the present invention, and is not intended to limit the scope of protection of the present invention. Equivalent embodiments or modifications thereof made without departing from the spirit of the present invention shall fall within the scope of protection of the present invention.

What is claimed is:

1. An ejector pin device for chip packaging, wherein the ejector pin device comprises a pin cylinder, a base and an ejector pin base module, the pin cylinder sleeves the ejector pin base module, the base is located below the ejector pin base module and is configured to fix the ejector pin base module;
   the ejector pin base module comprises three knob units and three supporting units;
   wherein the three supporting units are an outer supporting unit, a middle supporting unit and an inner supporting unit respectively;
   the three knob units are in one-to-one correspondence with the three supporting units, the three knob units comprising an outer knob, a middle knob and an inner knob respectively; and
   the outer supporting unit, the middle supporting unit and the inner supporting unit are nested with one another, a sliding groove is formed in a surface of each of the three supporting units, and adjacent supporting units move vertically through the sliding grooves under control of the three knob units;
   wherein dismountable ejector pins are disposed at a top of the three supporting units, the three knob units sleeve the three supporting units, and when each one of the three knob units is turned, a corresponding supporting unit of the three supporting units moves vertically;
   wherein vacuum holes and ejector pin holes corresponding to the dismountable ejector pins are formed in an upper surface of the pin cylinder.

2. The ejector pin device for chip packaging according to claim 1, wherein the dismountable ejector pins comprise a first ejector pin, a second ejector pin, a third ejector pin, a fourth ejector pin, a fifth ejector pin and a sixth ejector pin;
   a first platform is disposed above the outer supporting unit, and the first ejector pin and the second ejector pin are disposed at two ends of the first platform respectively;
   a second platform is disposed above the middle supporting unit, and the third ejector pin and the fourth ejector pin are disposed at two ends of the second platform respectively; and
   a third platform is disposed above the inner supporting unit, and the fifth ejector pin and the sixth ejector pin are disposed at two ends of the third platform respectively.

3. The ejector pin device for chip packaging according to claim 2, wherein the ejector pin holes comprise six ejector pin holes; the six ejector pin holes are formed in the upper surface of the pin cylinder, and correspond to the first ejector pin, the second ejector pin, the third ejector pin, the fourth ejector pin, the fifth ejector pin and the sixth ejector pin respectively.

4. The ejector pin device for chip packaging according to claim 2, wherein the outer knob controls the first platform to move vertically; the middle knob controls the second platform to move vertically; and the inner knob controls the third platform to move vertically; and
   when the first platform, the second platform and the third platform move to the same horizontal plane, the first ejector pin, the second ejector pin, the third ejector pin, the fourth ejector pin, the fifth ejector pin and the sixth ejector pin are arranged in sequence.

5. The ejector pin device for chip packaging according to claim 2, wherein a first supporting post is disposed between the outer supporting unit and the first platform, a second supporting post is disposed between the middle supporting unit and the second platform, and a third supporting post is disposed between the inner supporting unit and the third platform; and
   a bent portion is disposed at a lower end of the second supporting post.

6. The ejector pin device for chip packaging according to claim 1, wherein a basic shaft is vertically disposed at a center of the base and corresponds to the sliding groove in the inner surface of the inner supporting unit; and
   a circular hole is formed in a surface of the base.

7. The ejector pin device for chip packaging according to claim 5, wherein a groove corresponding to the bent portion of the second supporting post is formed in a top of the inner supporting unit.

8. The ejector pin device for chip packaging according to claim 1, wherein each knob of the three knob units comprises a guide groove for driving a respective supporting unit of the three supporting units; and wherein each supporting unit of the three supporting units comprises a protrusion on an outer side thereof, matching the guide groove of the respective knob unit.

* * * * *